(12) United States Patent
Wu

(10) Patent No.: US 10,203,348 B2
(45) Date of Patent: Feb. 12, 2019

(54) FAN DETECTION CHIP, A METHOD AND A SYSTEM USING THE SAME

(71) Applicant: NUVOTON TECHNOLOGY CORPORATION, Hsinchu (TW)

(72) Inventor: Chun-Yi Wu, Hsinchu Science Park (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 52 days.

(21) Appl. No.: 15/813,842

(22) Filed: Nov. 15, 2017

(65) Prior Publication Data

US 2019/0011475 A1   Jan. 10, 2019

(30) Foreign Application Priority Data

Jul. 6, 2017   (TW) .............................. 106122705 A

(51) Int. Cl.
| | |
|---|---|
| *H02P 7/00* | (2016.01) |
| *G01P 3/49* | (2006.01) |
| *H02M 7/5395* | (2006.01) |
| *F04D 27/00* | (2006.01) |
| *H02P 7/32* | (2006.01) |

(52) U.S. Cl.
CPC .............. *G01P 3/49* (2013.01); *F04D 27/001* (2013.01); *F04D 27/004* (2013.01); *H02M 7/5395* (2013.01); *H02P 7/325* (2013.01)

(58) Field of Classification Search
CPC ...... H02P 27/08; H02P 21/22; H02P 2205/01; H02M 7/5395; F04D 27/004

USPC ............................ 318/599, 268, 400.06, 432
See application file for complete search history.

(56) References Cited

U.S. PATENT DOCUMENTS

| | | | | |
|---|---|---|---|---|
| 5,075,608 | A * | 12/1991 | Erdman ................... | F23N 3/082 318/400.22 |
| 6,597,135 | B2 * | 7/2003 | Smith ...................... | H02P 7/285 318/257 |
| 7,466,089 | B2 * | 12/2008 | Beifus ....................... | H02P 6/04 318/254.1 |
| 7,683,566 | B2 * | 3/2010 | Fan .......................... | H02P 7/288 318/268 |
| 2015/0184667 | A1 * | 7/2015 | Fan ........................ | F04D 27/004 361/695 |

* cited by examiner

*Primary Examiner* — Thai Dinh
(74) *Attorney, Agent, or Firm* — Muncy, Geissler, Olds & Lowe, P.C.

(57) ABSTRACT

A fan detection chip, a fan detection method and a fan detection system are disclosed. In the fan detection system, a fan includes a power terminal and a speed signal terminal, and optionally includes a PWM signal terminal; a power supply module provides a driving voltage to the fan, a PWM signal generating module provides a first PWM signal and a second PWM signal which respectively have different duty cycles, a current sensing module respectively senses a first current and a second current flowing from the power supply module, and a control module compares the first current and the second current. The control module determines the fan to be a PWM fan when the first current is different from the second current, and the control module determines the fan to be a DC fan when the first current is the same as the second current.

18 Claims, 4 Drawing Sheets

FAN DETECTION CHIP, A METHOD AND A SYSTEM USING THE SAME

CROSS-REFERENCE TO RELATED APPLICATION

This application claims priority to Taiwan Patent Application No. 106122705, filed on Jul. 6, 2017, in the Taiwan Intellectual Property Office, the disclosure of which is incorporated herein in its entirety by reference.

BACKGROUND OF THE INVENTION

1. Field of the Invention

The present disclosure relates to a fan detection chip, a method and a system using the same. More particularly, the present disclosure relates to a fan detection chip capable of detecting a type of a fan based on a change in currents provided to the fan, and a method and a system using the same.

2. Description of the Related Art

While a computing device is operating, many electronic components inside the computing device, for example, a processor, a graphics card and so on, may generate a great deal of heat, and if the heat does not dissipated quickly, operational efficiency of the electronic components becomes lower, even the electronic components may be damaged because of high temperature. In order to dissipate heat, a fan is usually disposed inside the computing device, and configured to generate air flow to dissipate hot air surrounding the electronic components. In general, the fan operating in a higher revolving speed has a better heat dissipation efficiency, but also consumes more energy. In order to meet requirement in different revolving speeds for different situations, most fans are able to adjust the revolving speed thereof, and these fans can be classified into two types, one is DC fan having three pin terminals and the other is PWM fan having four pin terminals. Generally, the interface connector and control manner of the DC fan are both different from that of the PWM fan.

The revolving speed of DC fan is controlled by a driving voltage inputted from the power terminal, and is positively proportional to a level of the driving voltage; that is, when the driving voltage increases, the fan speed of the fan becomes higher; otherwise, when the driving voltage decreases, the fan speed of the fan becomes lower. The revolving speed of the PWM fan is controlled by a duty cycle of a PWM control signal inputted to the PWM control terminal of the PWM fan, and a constant voltage is provided to a power terminal of the PWM fan. When the duty cycle of the PWM control signal transmitted to the PWM control terminal increases or decreases, the revolving speed of the PWM fan becomes higher or lower in response to the duty cycle.

In order to drive the fan correctly, a type of the fan must be detected in advance. There are several conventional fan detection methods available in market, but each of the conventional fan detection methods must transmit a PWM control signal to the fan to rotate the fan in a certain revolving speed first, and then use a tachometer to detect a revolving speed of the fan, and determine the fan to be the DC fan or the PWM fan according to the revolving speed. However, the conventional fan detection methods make noise. As a result, what is need is to develop a fan detection chip, a method and a system using the same to solve the conventional technology problem.

SUMMARY OF THE INVENTION

In order to solve the aforementioned technical problems, the present disclosure is to provide a fan detection chip, a method and a system using the same for automatically determining the type of the fan, thereby driving the fan by a correct manner.

According to an embodiment, the present disclosure provides a fan detection chip which is applied to detect a type of a fan. The fan detection chip includes a first pin, a second pin, a third pin, a power supply module, a PWM signal generating module, a current sensing module and a control module. The first pin is electrically coupled to a first terminal of the fan. The second pin is electrically coupled a second terminal of the fan. The third pin is electrically coupled to a third terminal of the fan optionally. The power supply module is electrically coupled to a supply input terminal and the first pin, and configured to provide a driving voltage to the fan. The PWM signal generating module is electrically coupled to the third pin, and configured to provide, in a fan type detection mode, a first PWM signal and a second PWM signal which respectively have different duties. The current sensing module is disposed between the power supply module and the first pin, and configured to sense, in the fan type detection mode, a first current flowing from the power supply module when the PWM signal generating module outputs the first PWM signal, and sense a second current flowing from the power supply module when the PWM signal generating module outputs the second PWM signal. The control module is electrically coupled to the power supply module, the PWM signal generating module and the current sensing module, and configured to receive and compare the first current and the second current in the fan type detection mode. When the first current is different from the second current, the control module determines the fan to be a PWM fan, and when the first current is the same as the second current, the control module determines the fan to be a DC fan.

Preferably, the first terminal of the fan is a power terminal, and the second terminal of the fan is a speed signal terminal, and when the fan is the DC fan, the fan does not have the third terminal, and when the fan is the PWM fan, the fan has the third terminal as a PWM signal terminal.

Preferably, in the fan type detection mode, the current sensing module senses current flowing from the power supply module before the control module obtains a revolving speed of the fan according to a speed signal from the second terminal of the fan.

Preferably, the current sensing module is implemented by hardware circuit.

Preferably, the determination of the type of the fun according to the first current and the second current is performed by hardware circuit included in the control module.

Preferably, the PWM signal generating module includes a PWM signal processing module electrically coupled to the control module and configured to receive a determination signal from the control module.

Preferably, the PWM signal processing module transmits a PWM control signal to the PWM signal terminal according to the determination signal, thereby controlling a revolving speed of the PWM fan according to a duty cycle of the PWM control signal.

Preferably, the PWM signal processing module converts a PWM control signal into a voltage control signal according to the determination signal, and transmits the voltage control signal to the power supply module to change the driving voltage provided by the power supply module to the fan, thereby controlling a revolving speed of the DC fan.

Preferably, the PWM signal generating module is electrically coupled to a PWM signal input terminal and configured to receive a PWM control signal.

Preferably, the fan detection chip further includes a tachometer electrically coupled to the second pin and configured to receive an output signal of the speed signal terminal.

Preferably, the duty cycle of the second PWM signal is smaller than the duty cycle of the first PWM signal, and when the first current is higher than the second current, the control module determines the fan to be the PWM fan.

According to an embodiment, the present disclosure provides a fan detection method which is applicable to a fan detection chip for detecting a type of a fan. The fan detection chip includes a first pin, a second pin, a third pin, a power supply module, a PWM signal generating module, a current sensing module and a control module. The fan detection method includes following steps: generating, by the PWM signal generating module, a first PWM signal and transmitting the first PWM signal to a PWM signal terminal of the fan; sensing, by the current sensing module, a first current flowing from the power supply module to a power terminal of the fan; generating, by the PWM signal generating module, a second PWM signal which has a duty cycle different from a duty cycle of the PWM signal, and transmitting the second PWM signal to the PWM signal terminal; sensing, by the current sensing module, a second current flowing from the power supply module to a power terminal of the fan; comparing, by the control module, the first current with the second current, and determining the fan to be a PWM fan when the first current is different from the second current, and determining the fan to be a DC fan when the first current is the same as the second current.

Preferably, after the step of determining the fan to be the PWM fan, the fan detection method further includes a step of transmitting, by a PWM signal processing module of the fan detection chip, to the PWM signal terminal, thereby controlling a revolving speed of the PWM fan.

Preferably, the fan detection chip includes a tachometer configured to receive a speed signal from a speed signal terminal of the PWM fan.

Preferably, after the step of determining the fan to be the DC fan, the fan detection method further includes a step of converting, by a PWM signal processing module of the fan detection chip, a PWM control signal into a voltage control signal, and transmitting the voltage control signal to the power supply module to change a driving voltage which is provided by the power supply module to the DC fan, thereby controlling a revolving speed of the DC fan.

Preferably, the fan detection chip includes a tachometer configured to receive a speed signal from a speed signal terminal of the DC fan.

Preferably, the duty cycle of the second PWM signal is smaller than the duty cycle of the first PWM signal, and when the first current is higher than the second current, the control module determines the fan to be the PWM fan.

According to an embodiment, the present disclosure provides a fan detection system including a fan, a power supply module, a PWM signal generating module, a current sensing module, and a control module. The fan includes a power terminal and a speed signal terminal, and optionally includes a PWM signal terminal. The power supply module electrically coupled to a supply input terminal and configured to provide a driving voltage to the fan. The PWM signal generating module is electrically coupled to the PWM signal terminal, and configured to provide a first PWM signal and a second PWM signal which respectively have different duty cycles. The current sensing module is disposed between the power supply module and the supply input terminal, and configured to sense a first current flowing from the power supply module when the PWM signal generating module provides the first PWM signal, and sense a second current flowing from the power supply module when the PWM signal generating module provides the second PWM signal. The control module is electrically coupled to the power supply module, the PWM signal generating module and the current sensing module, and configured to receive and compare the first current and the second current. The control module determines the fan to be a PWM fan when the first current is different from the second current, and the control module determines the fan to be a DC fan when the first current is the same as the second current.

Preferably, the PWM signal generating module includes a PWM signal processing module electrically coupled to the control module and configured to receive a determination signal from the control module.

Preferably, the PWM signal processing module transmits a PWM control signal to the PWM signal terminal according to the determination signal, thereby controlling a revolving speed of the PWM fan according to a duty cycle of the PWM control signal.

Preferably, when the determination signal indicates that the fan is the DC fan, the PWM signal processing module converts a PWM control signal into a voltage control signal, and transmits the voltage control signal to the power supply module to change the driving voltage provided by the power supply module to the fan, thereby controlling a revolving speed of the DC fan.

Preferably, the PWM signal generating module is electrically coupled to a PWM signal input terminal to receive a PWM control signal.

Preferably, the fan detection system further includes a tachometer electrically coupled to the second pin and configured to receive a speed signal from the speed signal terminal.

Preferably, the duty cycle of the second PWM signal is smaller than the duty cycle of the first PWM signal, and when the first current is higher than the second current, the control module determines the fan to be the PWM fan.

According to above-mentioned content, the fan detection chip, the fan detection method and the fan detection system of the present disclosure can have at least one of the following advantages.

First, the fan detection chip, the fan detection method and the fan detection system can use a simple current sensing circuit in detection of the type of the fan without using complicated hardware device and software program.

Secondly, the fan detection chip, the fan detection method and the fan detection system of the present disclosure can transmit a PWM signal or convert the PWM signal into a voltage control signal for correctly controlling the revolving speed of the fan after the type of the fan is determined.

Thirdly, the fan detection chip, the fan detection method and the fan detection system of the present disclosure can support plug-and-play function for the fan, so that the procedures for detecting and setting the fan can be reduced when the user replace a new fan.

BRIEF DESCRIPTION OF THE DRAWINGS

The structure, operating principle and effects of the present disclosure will be described in detail by way of various embodiments which are illustrated in the accompanying drawings.

DETAILED DESCRIPTION OF THE PREFERRED EMBODIMENTS

Figure 1:
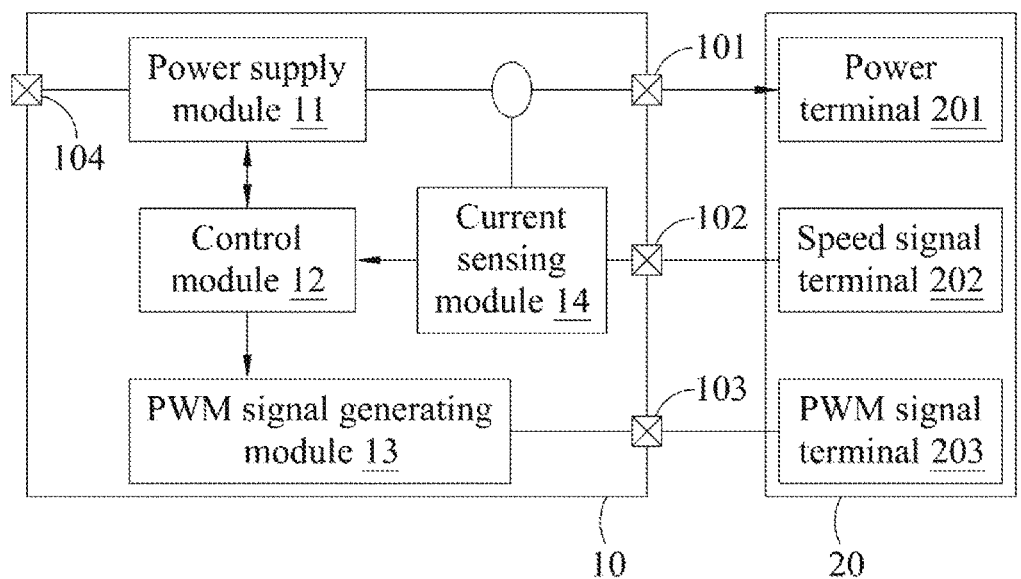
FIG. 1 is a block diagram of an embodiment of a fan detection system of the present disclosure.

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present invention. As used herein, the term "or" includes any and all combinations of one or more of the associated listed items.

The following refers to FIG. 1, which is a block diagram of an embodiment of a fan detection system of the present disclosure. The fan detection system includes a fan detection chip 10 electrically coupled to a fan 20, and the fan detection chip 10 determines a type of the fan 20 and drives the fan 20 to rotate by a correct control manner according to a determination result. The fan detection chip 10 includes a power supply module 11, a control module 12, a PWM signal generating module 13 and a current sensing module 14. The power supply module 11 is electrically coupled to a power terminal 201 of the fan 20 through a first pin 101 of the fan detection chip 10, a speed signal terminal 202 of the fan 20 is electrically coupled to a second pin 102 of the fan detection chip 10, and a PWM signal terminal 203 of the fan 20 is electrically coupled to a third pin 103 optionally. For convenience in explanation of this embodiment, a PWM fan having four pin terminals is taken as an example of the fan 20 in FIG. 1, and the fan 20 includes a ground terminal (not shown in FIG. 1), the power terminal 201, the speed signal terminal 202 and the PWM signal terminal 203. It should be noted that the fan 20 may be a DC fan having three pin terminals, and in this case, the fan 20 does not include the PWM signal terminal 203, so the third pin 103 is floating. For this reason, in the coupling relationship between the fan detection chip 10 and the fan 20 of this embodiment, the third pin 103 is electrically coupled to the PWM signal terminal 203 optionally.

The control module 12 of the fan detection chip 10 is electrically coupled to the power supply module 11, the PWM signal generating module 13 and the current sensing module 14. The power supply module 11 is electrically coupled to a power source through the supply input terminal 104, and receives power from the power source. The power supply module 11 is configured to provide the fan 20 with a driving voltage to drive rotation of the fan 2. After the fan detection chip 10 is connected with the fan 20 or the fan detection system is powered on, the PWM signal generating module 13 provides a first PWM signal to the PWM signal terminal 203 of the fan 20, and the current sensing module 14 of the fan detection chip 10 senses a current flowing from the power supply module 11 to the power terminal 201, and records the sensed current as a first current. Next, in a fan type detection mode, the PWM signal generating module 13 provides a second PWM signal to the PWM signal terminal 203, and the second PWM signal has a duty cycle different from that of the first PWM signal, for example, the duty cycle of the second PWM signal is 50%. The current sensing module 14 also senses the current flowing from the power supply module 11 and records the sensed current as a second current. The control module 12 receives and compares the first current and the second current, so as to determine a type of the fan 20 according to comparison result between the first current and the second current.

When the fan 20 is a PWM fan, the third pin 103 of the fan detection hip 10 is electrically coupled to the PWM signal terminal 203 of the fan 20, so that the fan 20 can receive the first PWM signal through the PWM signal terminal 203, and a revolving speed of the fan 20 is controlled based on the duty cycle of the first PWM signal. For this reason, when the fan 20 receives the second PWM signal having different duty cycle later, the revolving speed of the fan 20 is changed. For example, when the duty cycle of the second PWM signal is 50% of that of the first PWM signal, the revolving speed of the fan 20 is reduced to a half of the revolving speed corresponding to the first PWM signal; at this time, under a condition that the driving voltage provided by the power supply module 11 does not changed but the driving power required by the fan is changed, the current outputted from the power supply module 11 must be changed correspondingly. As a result, after the control module 12 determines that the first current is different from the second current, the control module 12 can determine the fan 20 is the PWM fan. When the fan is a DC fan, the third pin 103 of the fan detection chip 10 is floating, so the fan 20 is not affected by the first PWM signal or the second PWM signal. As a result, after the control module 12 determines that the first current is the same as the second current, the control module 12 can determine the fan 20 to be the DC fan.

In an embodiment, the current sensing module can be implemented by hardware circuit; and, the determination of the type of the fun according to the first current and the second current can be performed by hardware circuit (such as logic circuit and register) included in the control module.

In an embodiment, the fan detection chip can directly detect the type of the fan by comparing the two currents sensed in the fan type detection mode. Compared with the conventional detection manner according to the two revolving speeds of the fan, the fan detection technology of the present disclosure is easier, more quick and less noise, for example, the fan detection technology of the present disclosure can complete the fan detection process without waiting the revolving speed of the fan to become stable, so the fan detection technology of the present disclosure can complete the fan type detection more quickly.

In an embodiment, in the fan type detection mode, the current sensing module senses current flowing from the power supply module before the control module obtains a revolving speed of the fan according to a speed signal from the second terminal of the fan, so the fan detection technology of the present disclosure can complete the fan type detection more quickly.

Furthermore, the current sensing module can be implemented by hardwire circuit, and the determination of the type of the fun according to the first current and the second current can be performed by hardwire circuit included in the control module, such as logic circuit in cooperation with register.

Figure 2:
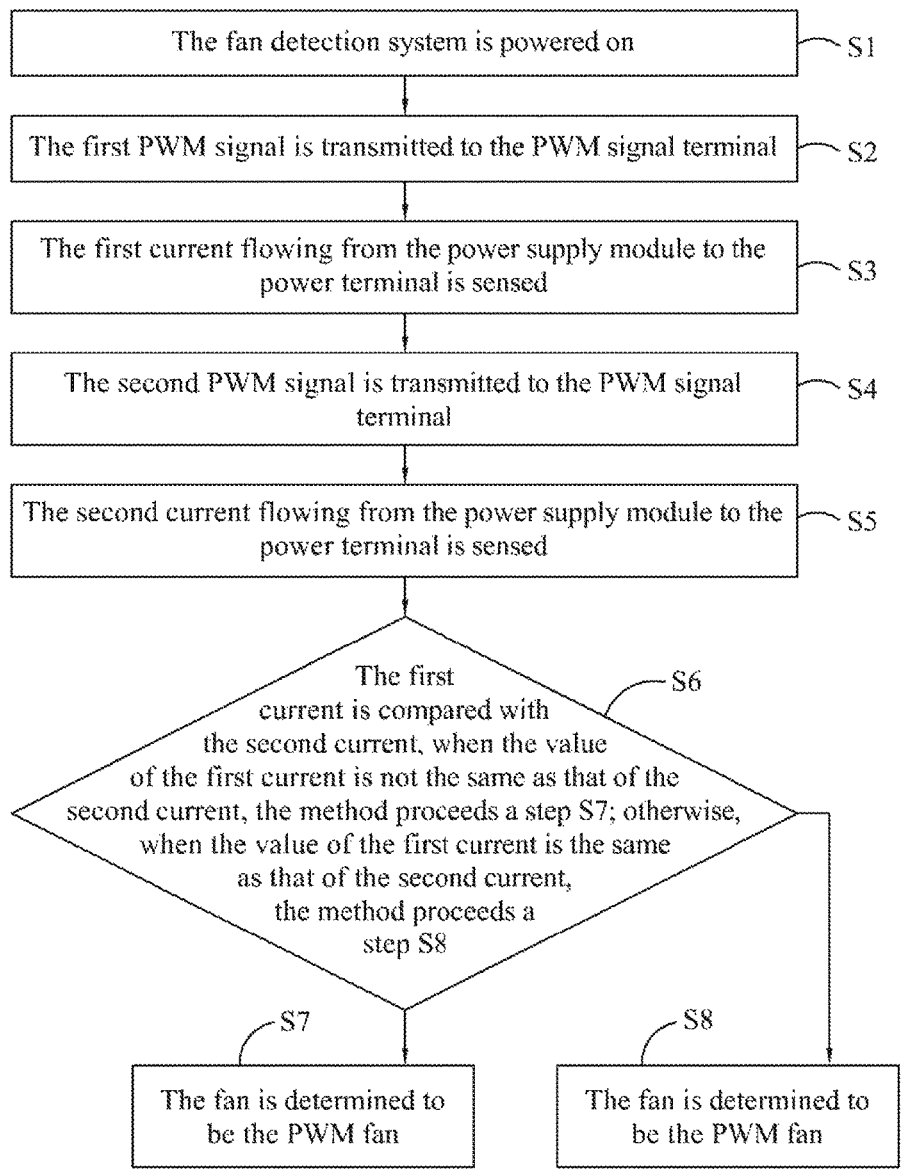
FIG. 2 is a flowchart showing the steps in an operation of an embodiment of a fan detection method of the present disclosure.

The following refers to FIG. 2, which is a flowchart showing the steps in an operation of an embodiment of the fan detection method of the present disclosure. In this embodiment, the fan detection method is applicable to the fan detection system shown in FIG. 1, and includes following steps.

In a step S1, the power source for the fan detection system is powered on. When the fan detection chip 10 is electrically coupled to the fan 20 or the fan detection system is powered on, the type of the fan 20 is unknown for the fan detection chip 10, and the fan detection chip 10 performs following steps to determine the type of the fan 20.

In a step S2, a first PWM signal is transmitted to the PWM signal terminal. The PWM signal generating module 13 generates the first PWM signal and transmits the first PWM signal to the PWM signal terminal 203 of the fan 20 through the third pin 103.

In a step S3, the first current flowing from the power supply module to the power terminal is sensed. The current sensing module 14 of the fan detection chip 10 senses the current flowing from the power supply module 11 to the power terminal 201, and records the sensed current as the first current which corresponds to the first PWM signal.

In a step S4, the second PWM signal is transmitted to the PWM signal terminal. After transmission of the first PWM signal, the PWM signal generating module 13 generates the second PWM signal, which has the duty cycle different from that of the first PWM signal, and also transmits the second PWM signal to the PWM signal terminal 203.

In a step S5, the second current flowing from the power supply module to the power terminal is sensed. The current sensing module 14 of the fan detection chip 10 senses the current flowing from the power supply module 11 to the power terminal 201 when the second PWM signal is transmitted to the PWM signal terminal, and then records the sensed current as the second current which corresponds to the second PWM signal.

In a step S6, the first current is compared with the second current, for example, the values of the first current and the second current are compared with each other. when the value of the first current is not the same as that of the second current, the method proceeds a step S7, and the fan 20 is determined to be the PWM fan; otherwise, when the value of the first current is the same as that of the second current, the method proceeds a step S8, and the fan 20 is determined to be the DC fan. The type of the fan 20 can be determined according to comparison result.

In the step S7, when the value of the first current is not equal to that of the second current, it indicates that the second PWM signal having different duty cycle changes the revolving speed of the fan 20 and the value of the current flowing from the power supply module 11 is also changed, so the fan 20 can be determined to be the PWM fan.

In the step S8, when the value of the first current is equal to that of the second current, it indicates that the second PWM signal having different duty cycle does not change the revolving speed of the fan 20 and the value of the current flowing from the power supply module 11 is also not changed; in other words, the fan 20 is not affected by the PWM signal, so the fan 20 can be determined to be the DC fan.

Figure 3:
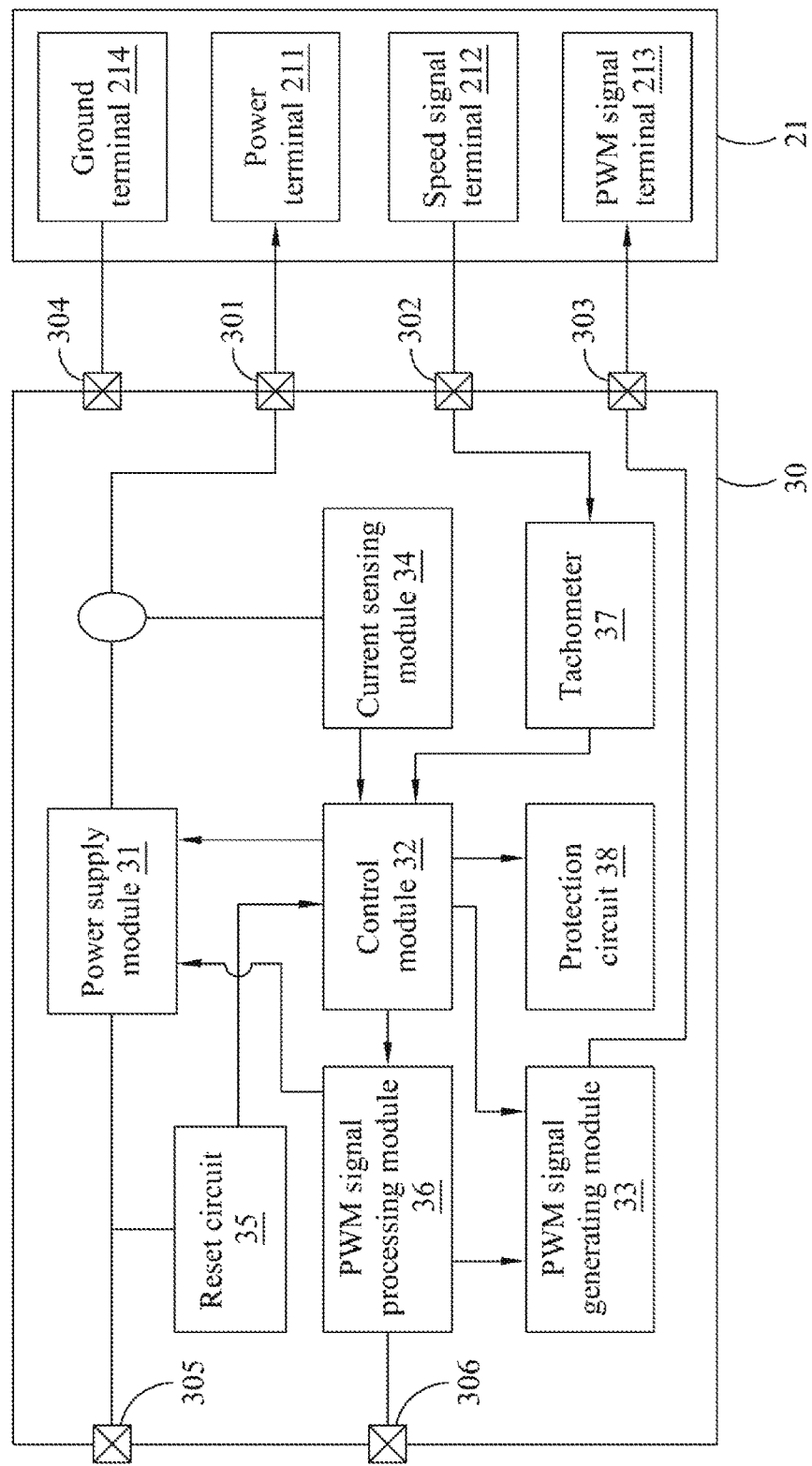
FIG. 3 is a schematic view of an embodiment of a fan detection chip of the present disclosure.

The following refers to FIG. 3, which is a schematic view of an embodiment of the fan detection chip of the present disclosure. The fan detection chip 30 includes a power supply module 31, a control module 32, a PWM signal generating module 33 and a current sensing module 34, and these modules can be implemented by integrated circuits. Some functions of these modules are the same as that of previous embodiment, so their description is not repeated. The fan detection chip 30 includes a first pin 301 electrically coupled to a power terminal 211 of the fan 21, a second pin 302 electrically coupled to a speed signal terminal 212 of the fan 21, a third pin 303 electrically coupled to a PWM signal terminal 213 of the fan 21, and a fourth pin 304 electrically coupled to a ground terminal 214 of the fan 21. In this embodiment, the PWM fan having four pin terminals is taken as an example for the fan 21; in the other hands, when the fan 21 is the DC fan, the third pin 303 of the fan detection chip 30 is floating.

The fan detection chip 30 includes a supply input terminal 305 and a PWM signal input terminal 306, and the power supply module 31 receives power from a power source through the supply input terminal 305, and the power supply module 31 is configured to supply power to the power terminal 211 of the fan 21 through the first pin 301, so as to provide driving voltage to the fan 21 to drive rotation of the fan 21. A reset circuit 35 is disposed between the supply input terminal 305 and the power supply module 31. After the fan detection system is reset or connected to the power source, the reset circuit 35 triggers the control module 32 to control the PWM signal generating module 33 to generate the first PWM signal and the second PWM signal sequentially for detection of the type of the fan 21. Furthermore, the fan detection chip 30 may include a PWM signal processing module 36 which is electrically coupled to the control module 32 to receive a determination signal of the control module 32. After the control module 32 determines the fan 21 to be the PWM fan, the PWM signal processing module 36 can control the PWM signal generating module 33 to transmit the PWM control signal to the PWM signal terminal 213, thereby adjusting the revolving speed of the PWM fan according to the duty cycle of the PWM control signal. After the control module 32 determines the fan 21 to be the DC fan, the PWM signal processing module 36 converts the PWM control signal into a voltage control signal, and transmits the voltage control signal to the power supply module 31 to adjust the driving voltage transmitted to the power terminal 211, thereby adjusting the revolving speed of the fan 21. The PWM signal processing module 36 can be electrically coupled to the PWM signal input terminal 306 to receive an external input instruction, and adjust the revolving speed of different type of the fan 21 by the correct manner, in response to the external input instruction. As a result, the fan 21 can be correctly driven to dissipate heat of the computing device efficiently.

Furthermore, the fan detection chip 30 can include a tachometer 37 which is electrically coupled to the speed signal terminal 212 of the fan 21 through the second pin 302, and configured to receive an output signal indicative of an actual rotational speed of the fan 21 in operation, and transmit the output signal to the control module 32. Furthermore, the fan detection chip 30 can include a protection circuit 38, such as an over-current protection circuit or an over-temperature protection circuit. The protection circuit 38 can be electrically coupled to the control module and configured to monitor an operational status of the fan detection chip 30, thereby providing over-current protection or over-temperature protection to prevent the fan detection chip 30 from being damaged.

Figure 4:
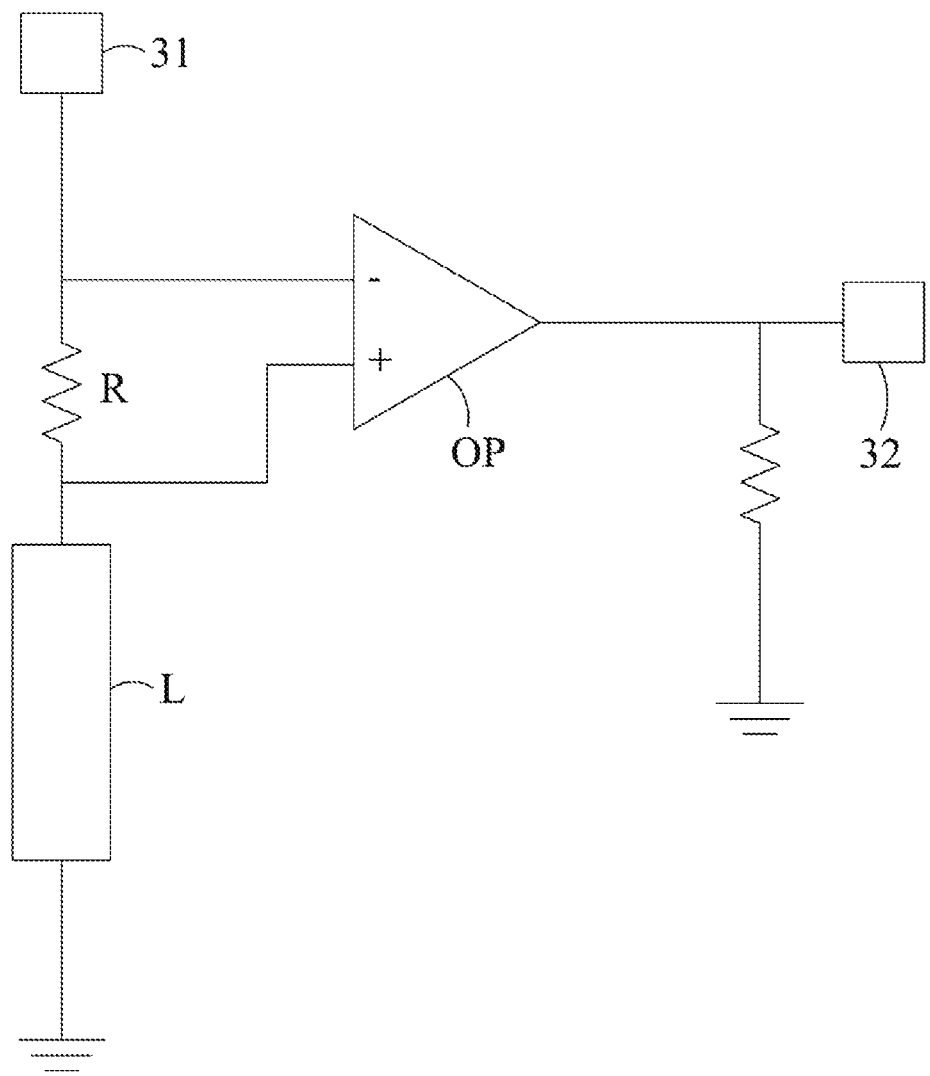
FIG. 4 is a schematic view of a current sensing circuit of the fan detection chip of the present disclosure.

The following refers to FIG. 4, which is a schematic view of a current sensing circuit of the fan detection chip of the present disclosure. A sensing resistor R is disposed in a current path between the power supply module 31 and a current load L of the fan, so that a voltage is formed across the sensing resistor R and amplified by the sense amplifier OP to generate an output signal proportional to the current flowing through the sensing resistor R. The output signal is transmitted to the control module 32. When the fan detection chip detects the type of the fan, the power supply module 31 supplies power to the power terminal 211 through the first pin 301, to provide the fan 21 with a fixed driving voltage. After the fan detection chip provides the second PWM signal with the 50% of duty cycle to the fan 21, when the revolving speed of the fan 21 is reduced in response to the smaller duty cycle of the PWM signal, the current flowing from the power supply module 31 to the current load L is also decreased. As a result, when the second current sensed by the sensing circuit is lower than the first current, the control module can determines the fan 21 to the PWM fan according to the comparison result between the second current and the first current. In contrast, when the sense signal outputted from the sensing circuit is not changed, the control module can determine that the fan 21 is the DC fan having three pin terminals without the PWM signal terminal electrically coupled to the third pin 303.

The present disclosure disclosed herein has been described by means of specific embodiments. However, numerous modifications, variations and enhancements can be made thereto by those skilled in the art without departing from the spirit and scope of the invention set forth in the claims.

What is claimed is:

1. A fan detection chip, comprising:
a first pin electrically coupled to a first terminal of the fan;
a second pin electrically coupled a second terminal of the fan;
a third pin electrically coupled to a third terminal of the fan optionally;
a power supply module electrically coupled to a supply input terminal and the first pin, and configured to provide a driving voltage to the fan;
a PWM signal generating module electrically coupled to the third pin, and configured to provide, in a fan type detection mode, a first PWM signal and a second PWM signal which respectively have different duties;
a current sensing module disposed between the power supply module and the first pin, and configured to sense, in the fan type detection mode, a first current flowing from the power supply module when the PWM signal generating module outputs the first PWM signal, and sense a second current flowing from the power supply module when the PWM signal generating module outputs the second PWM signal; and
a control module electrically coupled to the power supply module, the PWM signal generating module and the current sensing module, and configured to receive and compare the first current and the second current in the fan type detection mode, wherein when the first current is different from the second current, the control module determines the fan to be a PWM fan, and when the first current is the same as the second current, the control module determines the fan to be a DC fan.

2. The fan detection chip according to claim 1, wherein the first terminal of the fan is a power terminal, and the second terminal of the fan is a speed signal terminal, and when the fan is the DC fan, the fan does not have the third terminal, and when the fan is the PWM fan, the fan has the third terminal as a PWM signal terminal.

3. The fan detection chip according to claim 1, wherein in the fan type detection mode, the current sensing module senses current flowing from the power supply module before the control module obtains a revolving speed of the fan according to a speed signal from the second terminal of the fan.

4. The fan detection chip according to claim 3, further comprising a tachometer electrically coupled to the second pin and configured to receive the speed signal from the speed signal terminal, and the control module obtains the revolving speed of the fan from the tachometer.

5. The fan detection chip according to claim 1, wherein the current sensing module is implemented by hardware circuit.

6. The fan detection chip according to claim 1, wherein the determination of the type of the fun according to the first current and the second current is performed by hardware circuit included in the control module.

7. The fan detection chip according to claim 1, wherein the PWM signal generating module comprises a PWM signal processing module electrically coupled to the control module and configured to receive a determination signal from the control module.

8. The fan detection chip according to claim 7, wherein the PWM signal processing module transmits a PWM control signal to the PWM signal terminal according to the determination signal, thereby controlling a revolving speed of the PWM fan according to a duty cycle of the PWM control signal.

9. The fan detection chip according to claim 7, wherein the PWM signal processing module converts a PWM control signal into a voltage control signal according to the determination signal, and transmits the voltage control signal to the power supply module to change the driving voltage provided by the power supply module to the fan, thereby controlling a revolving speed of the DC fan.

10. The fan detection chip according to claim 1, wherein the duty cycle of the second PWM signal is smaller than the duty cycle of the first PWM signal, and when the first current is higher than the second current, the control module determines the fan to be the PWM fan.

11. A fan detection method, applicable to a fan detection chip for detecting a type of a fan, and the fan detection chip comprising a first pin, a second pin, a third pin, a power supply module, a PWM signal generating module, a current sensing module and a control module, and the fan detection method comprising:
  generating, by the PWM signal generating module, a first PWM signal and transmitting the first PWM signal to a PWM signal terminal of the fan;
  sensing, by the current sensing module, a first current flowing from the power supply module to a power terminal of the fan;
  generating, by the PWM signal generating module, a second PWM signal which has a duty cycle different from a duty cycle of the PWM signal, and transmitting the second PWM signal to the PWM signal terminal;
  sensing, by the current sensing module, a second current flowing from the power supply module to a power terminal of the fan; and
  comparing, by the control module, the first current with the second current, and determining the fan to be a PWM fan when the first current is different from the second current, and determining the fan to be a DC fan when the first current is the same as the second current.

12. The fan detection method according to claim 11, after the step of determining the fan to be the PWM fan, further comprising:
  transmitting, by a PWM signal processing module of the fan detection chip, to the PWM signal terminal, thereby controlling a revolving speed of the PWM fan.

13. The fan detection method according to claim 11, after the step of determining the fan to be the DC fan, further comprising:
  converting, by a PWM signal processing module of the fan detection chip, a PWM control signal into a voltage control signal, and transmitting the voltage control signal to the power supply module to change a driving voltage which is provided by the power supply module to the DC fan, thereby controlling a revolving speed of the DC fan.

14. The fan detection method according to claim 11, wherein the duty cycle of the second PWM signal is smaller than the duty cycle of the first PWM signal, and when the first current is higher than the second current, the control module determines the fan to be the PWM fan.

15. A fan detection system, comprising:
  a fan comprising a power terminal and a speed signal terminal, and optionally comprising a PWM signal terminal;
  a power supply module electrically coupled to a supply input terminal, and configured to provide a driving voltage to the fan;
  a PWM signal generating module electrically coupled to the PWM signal terminal, and configured to provide a first PWM signal and a second PWM signal which respectively have different duty cycles;
  a current sensing module disposed between the power supply module and the supply input terminal, and configured to sense a first current flowing from the power supply module when the PWM signal generating module provides the first PWM signal, and sense a second current flowing from the power supply module when the PWM signal generating module provides the second PWM signal; and
  a control module electrically coupled to the power supply module, the PWM signal generating module and the current sensing module, and configured to receive and compare the first current and the second current, wherein the control module determines the fan to be a PWM fan when the first current is different from the second current, and the control module determines the fan to be a DC fan when the first current is the same as the second current.

16. The fan detection system according to claim 15, wherein the PWM signal generating module comprises a PWM signal processing module electrically coupled to the control module and configured to receive a determination signal from the control module.

17. The fan detection system according to claim 16, wherein the PWM signal processing module transmits a PWM control signal to the PWM signal terminal according to the determination signal, thereby controlling a revolving speed of the PWM fan according to a duty cycle of the PWM control signal.

18. The fan detection system according to claim 16, wherein when the determination signal indicates that the fan is the DC fan, the PWM signal processing module converts a PWM control signal into a voltage control signal, and transmits the voltage control signal to the power supply module to change the driving voltage provided by the power supply module to the fan, thereby controlling a revolving speed of the DC fan.

* * * * *